Patented Jan. 28, 1936

2,029,239

UNITED STATES PATENT OFFICE 2,029,239

ANTHRAQUINONE DERIVATIVES

Georg Kränzlein, Frankfort-on-the-Main, Hans Schlichenmaier, Kelkheim in Taunus, and Ludwig Schörnig, Frankfort-on-the-Main, Germany, assignors to General Aniline Works, Inc., New York, N. Y., a corporation of Delaware No Drawing. Application February 16, 1933, Serial No. 657,153. In Germany February 23, 1932

6 Claims. (Cl. 260—60)

Our present invention relates to new compounds of the anthraquinone series, more particularly it relates to condensation products of the general formula:

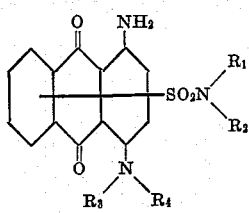

wherein $R_1$, $R_2$, $R_3$ and $R_4$ represent hydrogen, or aliphatic, alicyclic, aromatic or aliphatic-aromatic radicals which may be identical or different and wherein the anthraquinone nucleus may be substituted.

We have found that new and valuable derivatives of anthraquinone are obtainable by causing 1-amino-4-halogenanthraquinone sulfonic acid amides to react with ammonia or primary or secondary amines so that the halogen atom standing in the 4-position of the anthraquinone nucleus is replaced by the basic radical according to the following equation:

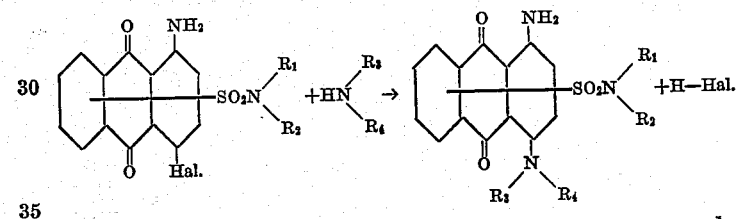

in which formulae the characters $R_1$, $R_2$, $R_3$ and $R_4$ have the above meaning and sulfonating the products thus obtained, if desired.

The condensation is suitably carried out by heating the said components in the presence of an acid binding agent, such as an alkali metal carbonate, -bicarbonate or -acetate and, where advantageous, while adding a small quantity of copper or a copper compound in order to accelerate the reaction. If the anthraquinone sulfonic acid amides contain substituents or groups which are capable of rendering the compounds soluble in water, the reaction may be carried out in an aqueous solution; if the components are insoluble in water, the condensation is suitably performed in an organic solvent or diluent, or even the amines as such are used as diluents or solvents.

Any primary or secondary amine of aliphatic, alicyclic, aromatic or aliphatic-aromatic nature is suitable and operative in the present process, it being only essential that a reactive hydrogen atom attached to the nitrogen atom of the amine is present. Furthermore the reaction is applicable in the case of all 1-amino-4-halogen-anthraquinone-sulfonic acid amides falling within the scope of the above general formula, no matter whether the amide radical contains hydrogen or aliphatic, alicyclic, aromatic or aliphatic-aromatic radicals.

It has been known that the halogen atom of 1-amino-4-halogen-anthraquinone-2-sulfonic acid may be replaced by amine radicals; it could, however, not be foreseen that the amides of 1-amino-4-halogen-anthraquinone-sulfonic acid would undergo this reaction without any injurious effect on the sulfonic acid amide group.

Our new products are well crystallizing, intensely colored compounds. Those products which do not contain sulfonic acid groups are easily soluble in chloroform, acetone, chlorobenzene and other customary organic solvents. The sulfonated products formed either from components which contain already the sulfonic acid group or made by sulfonating the condensation products are suitable for use as acid wool dyestuffs. The new compounds dissolve in concentrated sulfuric acid, generally with a blue or blue-green color. The color of the vatted products is mostly red-brown.

The 1-amino-4-halogen-anthraquinone sulfonic acid amides used as starting materials are obtainable by causing ammonia or a primary or secondary amine to react with a 1-amino-4-halogen-anthraquinone-sulfonic acid chloride or a nuclear substitution product thereof. The aminoanthraquinone sulfonic acid chlorides are obtainable by acting with phosphorus pentachloride on the sulfonic acids or their salts, preferably in the presence of phosphorus oxychloride.

The following examples serve to illustrate the invention but they are not intended to limit it thereto, the parts being by weight, unless otherwise stated:

(1) 4 parts of 1-amino-4-bromo-2-anthraquinone-sulfocyclo-hexylamide (obtainable by reaction of 1-amino—4-bromanthraquinone 2-sulfochloride with cyclohexylamine) are heated with 30 parts of anhydrous sodium acetate and 50 parts of aniline for 3 hours at 180° C. Thereby, the color of the melt which is at first brown becomes olive green and finally turns blue. When the reaction is finished, the excess of aniline is removed by extraction with dilute hydrochloric acid or steam-distillation. The reaction product forms a dark powder. In order to purify it, it is boiled several times with a large quantity of dilute caustic soda solution and recrystallized from glacial acetic acid or dichlorobenzene. It is thus obtained in the form of fine dark small crystals which dissolve, especially well while hot, in most organic solvents to a pure blue solution. They dissolve in sulfuric acid to a green-blue solution. The product melts at 215° C. to 216° C. It probably corresponds to the following formula:

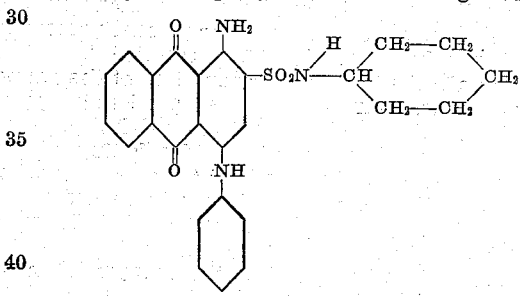

(2) 4 parts of 1-amino-4-bromanthraquinone-2-sulfocyclohexylamide are heated together with 30 parts of anhydrous sodium acetate, 0.3 part of cuprous chloride and 30 parts of 1-amino-4-methoxybenzene for 6 hours at 180° C. to 185° C. Thereby, the color of the melt finally turns bluish-green. When the reaction is finished, the excess of 1-amino-4-methoxybenzene is removed by extraction with dilute hydrochloric acid and the reaction product obtained is purified by boiling with dilute caustic soda solution as indicated in Example 1 and recrystallization from glacial acetic acid. It forms dark-blue fine needles which melt at 244° C. to 245° C. and have nearly the same properties of solubility as the 1-amino-2-sulfocyclohexyl-amido-4-anilidoanthraquinone of Example 1. The new compound corresponds with the probable formula:

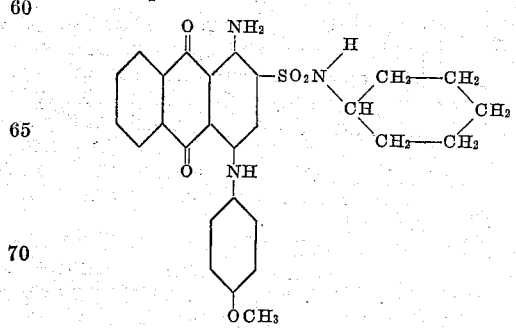

(3) 10 parts of 1-amino-4-bromo-anthraquinone-2-sulfomethyl-anilide-sulfonic acid (obtainable by sulfonation of 1-amino-4-bromanthraquinone-2-sulfomethylanilide) are heated for 14 hours at 90° C. to 95° C. together with 20 parts of para-toluidine, 5 parts of potassium- or sodium-bicarbonate, 1 part of cuprous chloride and 500–1000 cc. of water. Thereby, the light-red color of the solution soon turns reddish-blue. The solution is rendered weakly acid by means of dilute hydrochloric acid, and the reaction product is filtered with suction. By recrystallization from water to which a small quantity of pyridine has been added the reaction product is obtained in the form of fine blue needles.

The dyestuff thus obtained corresponds with the probable formula:

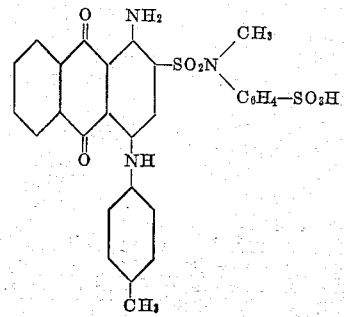

It dyes wool from a weakly acid solution blue tints.

A similar dyestuff may be obtained by starting from 1-amino-4-bromanthraquinone-2-sulfoethylanilide.

(4) 2.5 parts of 1-amino-4-anilido-anthraquinone-2-sulfanilide of the following formula:

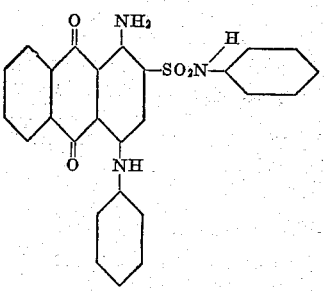

(obtainable from 1-amino-4-bromo-anthraquinone-2-sulfanilide and aniline analogously to the statements given in Example 2 and melting at 290° C.) are slowly introduced at about 5° C. into 30 parts of sulfuric acid monohydrate. Stirring is continued for half an hour and the whole is poured on ice. The sulfonation product thereby separates as a blue precipitate. It is filtered by suction and dissolved in boiling water. The solution is filtered hot and the dyestuff is salted out by addition of potassium chloride. It forms a blue powder which dyes wool from an acid bath blue tints. The sulfonation product still contains the sulfanilide group and is not identical with 1-amino-4-anilido-anthraquinone-2-sulfonic acid.

(5) 10 parts of 1-amino-4-bromanthraquinone-2-sulfomethylanilide, obtainable from 1-amino-4-bromanthraquinone-2-sulfochloride and methylaniline, are heated with 30 parts of cyclohexylamine for about 3 hours at 130° C. Thereby, the reaction mass finally assumes a deep blue coloration. The mass is then poured into dilute hydrochloric acid; the dark precipitate obtained thereby is filtered with suction, washed with a small quantity of alcohol and recrystallized from glacial acetic acid. The 1-amino-4-cyclohexylamino-anthraquinone-2-sulfomethylanilide of the following formula

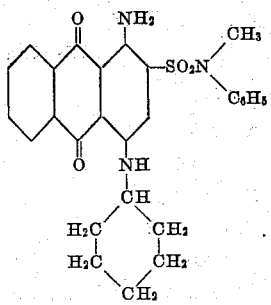

forms deep-blue small needles which melt at 228° C. to 229° C. In order to sulfonate it, 2 parts thereof are introduced at about 5° C. into 30 parts of sulfuric acid monohydrate and stirred for about 1 hour. The product may be worked up as described in Example 4 and forms a blue powder which dyes wool blue tints. The sulfonation product has the probable following formula:

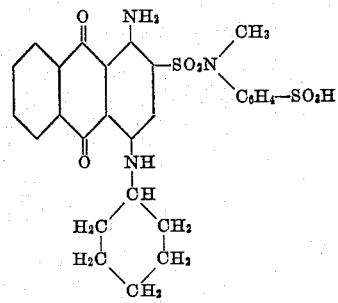

It still contains the sulfomethylanilide group and is not identical with 1-amino-4-cyclohexylamino-anthraquinone-2-sulfonic acid.

(6) 10 parts of 1-amino-4-bromo-anthraquinone-2-sulfochloride are caused to react with 25 parts of a 15% solution of the potassium salt of methyltaurine in a ball mill. After about 20 hours the dark-red paste is filtered with suction. The potassium salt of 1-amino-4-bromo-anthraquinone-2-sulfomethyltauride thus obtained is purified by recrystallization from water. It is thereby obtained in the form of very small, short scarlet red crystals which are difficultly soluble in cold water. 6.5 parts of the potassium salt of 1-amino-4-bromo-2-sulfomethyltauride recrystallized from water, are heated for about 3 hours at 50° C.-60° C. together with 2 parts of sodium carbonate, 100 parts of water, 35 parts of cyclohexylamine and 1 part of cuprous chloride. The reaction mass soon assumes a blue coloration. The salt of 1-amino-4-cyclohexylamino-anthraquinone-2-sulfomethyltauride is advantageously isolated by addition of sodium carbonate solution and further purified by repeatedly dissolving it in water and precipitating it therefrom by means of sodium carbonate, sodium chloride or chlorammonium. It forms a dark-blue powder which dyes wool from an acid bath blue tints. The hot aqueous solution of the salt gelatinizes on cooling. The product has the following probable formula:

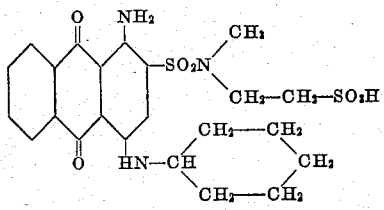

We claim:
1. The anthraquinone derivatives of the general formula:

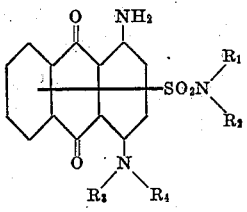

wherein $R_1$, $R_2$, $R_3$ and $R_4$ represent hydrogen or aliphatic, alicyclic, aromatic or aliphatic-aromatic radicals, which compounds are well crystallizing, intensely colored products, dissolving in concentrated sulfuric acid mostly with a blue to blue-green color and yielding with alkaline hydrosulfite a red-brown vat.

2. The anthraquinone derivatives of the general formula:

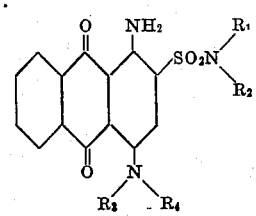

wherein $R_1$, $R_2$, $R_3$ and $R_4$ represent hydrogen or aliphatic, alicyclic, aromatic or aliphatic-aromatic radicals, which compounds are well crystallizing, intensely colored products, dissolving in concentrated sulfuric acid mostly with a blue to blue-green color and yielding with alkaline hydrosulfite a red-brown vat.

3. The anthraquinone derivatives of the general formula:

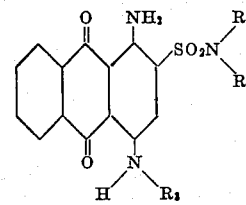

wherein $R_1$ stands for hydrogen or alkyl, $R_2$ for an alkyl radical, a radical of the benzene series or for the cyclohexyl radical, and $R_3$ for a radical of the benzene series or for the cyclohexyl radical, which compounds are well crystallizing, intensely colored products, dissolving in concentrated sulfuric acid mostly with a blue to blue-green color and yielding with alkaline hydrosulfite a red-brown vat.

4. The compound of the formula:

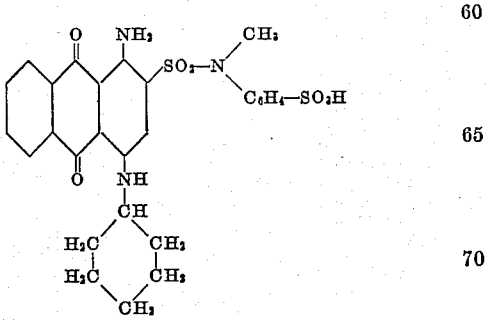

being in the dry state a blue powder, dyeing wool from an acid bath blue shades.

5. The compound of the formula:

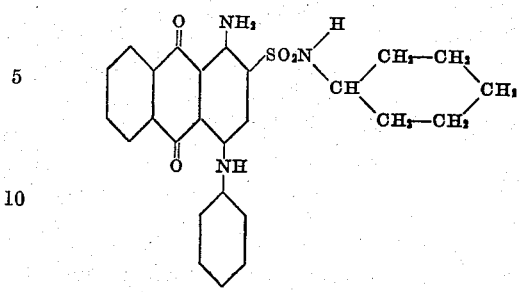

crystallizing from glacial acetic acid or dichlorobenzene in the form of fine dark crystals, having a melting point of 215° C. to 216° C. being soluble in most of the ordinary organic solvents with a pure blue color and in concentrated sulfuric acid with a green-blue color.

6. The compound of the formula:

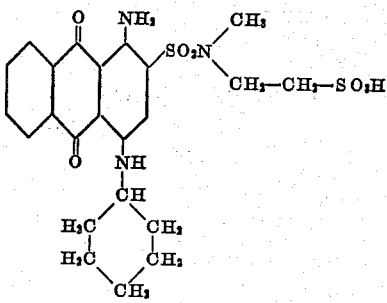

being in the dry state a dark-blue powder, dyeing wool from an acid bath blue tints.

GEORG KRÄNZLEIN.
HANS SCHLICHENMAIER.
LUDWIG SCHÖRNIG.